(12) United States Patent  
Higashino

(10) Patent No.: US 6,190,259 B1
(45) Date of Patent: Feb. 20, 2001

(54) STEERING JOINT DEVICE FOR A CAR

(75) Inventor: Kiyoharu Higashino, Gunma-ken (JP)

(73) Assignee: NSK Ltd., Tokyo (JP)

( * ) Notice: Under 35 U.S.C. 154(b), the term of this patent shall be extended for 0 days.

(21) Appl. No.: 09/168,613

(22) Filed: Oct. 9, 1998

(30) Foreign Application Priority Data

Oct. 9, 1997 (JP) .................................................. 9-291808

(51) Int. Cl.$^7$ ...................................................... F16D 3/78
(52) U.S. Cl. ................................................. 464/93; 464/92
(58) Field of Search .............................. 464/92, 93, 98, 464/114, 119, 153, 147

(56) References Cited

U.S. PATENT DOCUMENTS

| 4,702,722 | 10/1987 | Narue et al. . | |
|---|---|---|---|
| 5,152,718 | * 10/1992 | Confer | 464/93 |
| 5,222,913 | 6/1993 | Nagashima . | |
| 5,888,139 | * 3/1999 | Hoshino | 464/93 |
| 5,941,776 | * 8/1999 | Kambies | 464/93 |

FOREIGN PATENT DOCUMENTS

| 567202 | * 9/1975 | (CH) | 464/93 |
|---|---|---|---|
| 61-197820 | 9/1986 | (JP) . | |
| 64-44872 | 3/1989 | (JP) . | |
| 4-91568 | 8/1992 | (JP) . | |

* cited by examiner

Primary Examiner—Lynne H. Browne
Assistant Examiner—Aaron Dunwoody
(74) Attorney, Agent, or Firm—Vorys, Sater, Seymour and Pease LLP

(57) ABSTRACT

A steering joint device for a car comprises a first universal joint coupled to a steering shaft, a second universal joint connected to the steering gear device side, and an anti-vibration device connected between the first universal joint and the second universal joint. The first universal joint comprises a first yoke member to be connected to the steering shaft, a second yoke member connected to the anti-vibration device, and a first cross shaft member for connecting the first yoke member to the second yoke member, the second universal joint comprises a third yoke member to be connected to the steering gear device side, a fourth yoke member connected to the anti-vibration device, and a second cross shaft member coupled between the third yoke member and the fourth yoke member, and the anti-vibration device is connected by two first pins to the bottom plate portion of the second yoke member through the two holes formed therethrough, and connected by pins on a straight line which makes a predetermined angle θ (where 0<θ≦90°) with a straight line which connects the centers of the pin connected portions to the bottom plate portion of the fourth yoke member through two holes formed on the bottom plate portion of the fourth yoke member.

7 Claims, 8 Drawing Sheets

CIRCUMFERENTIAL PHASE IS SHIFTED

US 6,190,259 B1

STEERING JOINT DEVICE FOR A CAR

This application claims the benefit of Japanese Application No. 9-291808 which is hereby incorporated by reference.

BACKGROUND OF THE INVENTION

1. Field of the Invention

The present invention relates to a steering joint device for a vehicle, such as car. Specially, the present invention relates to a steering joint device for coupling a steering device with a steering gear device in a vehicle.

2. Related Background Art

A steering joint device of this kind is adapted to couple a terminal side of a steering shaft to a steering gear device, as disclosed, for example, in Japanese Patent Application Laid-Open No. 61-197820. such steering joint device is provided with an anti-vibration device or vibration prevention device for preventing a vibration which is caused by the tires on a road, a vibration which is caused by an engine suspension, or the like, from being transmitted to the inside of the vehicle through a steering shaft.

An example of the conventional steering joint device will be described below with reference to FIGS. 8 to 10B. Referring to FIG. 8, a steering joint device is comprised of a first universal joint 1 which is fixed to the fore end side of a steering shaft (not shown), a second universal joint 2 which is connected to the steering gear device side, and an anti-vibration device 3 for coupling these two universal joints.

The first universal joint 1 includes a first yoke member 11, a second yoke member 12, and a cross shaft member 13 for coupling the first yoke member 11 with the second yoke member 12.

The first yoke member 11 integrally has a cylindrical portion 11a which is fitted on and fixed to the tip end of the steering shaft and a yoke portion 11b which has bifurcated opposed portions. The second yoke member 12 integrally has two side plate portions 12a, 12b which are extended in parallel to face each other, and a bottom plate portion 12c for connecting these side plate portions 12a, 12b.

One shaft 13a of the first cross shaft member 13 is extended perpendicular to the sheet plane of the FIG. 8 and is pivotally supported on the yoke portion 11b of the first yoke member 11 at the two shaft ends thereof, whereas the two shaft ends of the other shaft 13b which is extended at right angles with the former shaft 13a are respectively supported by the two side plate portions 12a, 12b of the second yoke member 12 through bearings 13c, 13d. To this end, the two side plate portions 12a, 12b of the second yoke member 12 are respectively provided with bearing holes 12d, 12e (FIG. 9A) so as to face each other.

On the bottom plate portion 12c of the second yoke member 12, there are formed two holes 12f, 12g on a straight line which makes a right angle with a straight line obtained by projecting the straight line X1—X1 connecting the centers of the bearing holes 12d, 12e onto the bottom plate portion 12c, and which passes a point $0_1$ obtained by projecting the middle point of a segment of a line connecting the centers of the bearing holes 12d, 12e onto the bottom plate portion 12c, with this point $0_1$ as the middle point therebetween.

On the other hand, a third yoke member 21 of the second universal joint 2 integrally has a cylindrical portion 21a to be fitted on and fixed to an shaft (not shown) on the steering gear side and a yoke portion 21b which has bifurcated opposed portions. A fourth yoke member 22 integrally has side plate portions 22a, 22b which extend in parallel to oppose to each other, and a bottom plate portion 22c connecting these side plate portions 22a, 22b as an integral structure.

One shaft 23a of a second cross shaft member 23 is extended perpendicular to the sheet plane and is pivotally supported on the yoke portion 21b of the third yoke member 21 at the two shaft ends, whereas the both shaft ends of the other shaft 23b which extends perpendicular to the shaft 23a are respectively supported by the two side plate portions 22a, 22b of the fourth yoke member 22 through bearings 23c, 23d.

To this end, the two side plate portions 22a, 22b of the fourth yoke member 22 are respectively provided with bearing holes 22d, 22e (FIG. 9B) to face each other.

The anti-vibration device 3 has a circular anti-vibration rubber 31. This anti-vibration rubber 31 has a rigid structure with internal reinforced fibers. Four through holes for pin insertion are formed through the rubber 31 on crossing lines perpendicular to each other and passing the center of the structure. Only one of the holes is shown in the drawing.

A pair of through holes out of the through holes for pin insertion which face each other in the diameter direction are opposed to the two holes 12f, 12g which are formed on the bottom plate portion 12c of the first yoke member 12 of the first universal joint 1, and pins 32a, 32b are inserted through these corresponding holes 12f, 12g. A structure for connecting the pins 32a, 32b with the bottom plate portion 12c and the anti-vibration rubber 31 is the same as a structure for connecting the anti-vibration rubber 31 with an oval flange portion 33a of a lower shaft 33, the structure of which will be described later. The latter is shown in the drawing and will be fully described.

More specifically, holes for pin insertion are formed through the oval flange 33a of the lower shaft 33 to face the two remaining through holes of the anti-vibration rubber 31, and pins 34a, 34b are inserted through these holes, respectively. FIG. 8 shows a cross section of a part of the pin 34a out of the two pins 34a, 34b. The pin 34a is inserted through a hole of the anti-vibration rubber 31 through a bush 35. A stopper 36 made of a metallic plate is interposed between an enlarged end portion 34c of the pin 34a and the anti-vibration rubber 31, and the pin 34a is caulked onto the oval flange 33a at the opposite end portion to connect the anti-vibration rubber 31 to the oval flange portion 33a. The bush 35 is provided to surround the pin 34a from the stopper 36 to the oval flange 33a. The stopper 36 is extended as if striding over the pins 32a, 32b described above which are adapted to connect the bottom plate portion 12c of the second yoke member 12 of the first universal joint 1 to the anti-vibration device 3, so as to form a predetermined space between the stopper 36 and the outer periphery of the pin 32a or 32b.

The bottom plate portion 12c of the second yoke member 12 and the anti-vibration rubber 31, and the anti-vibration rubber 31 and the oval flange 33a of the lower shaft are respectively connected by the pins in the above-mentioned manner. Thus, a torque is transmitted through the anti-vibration rubber 31 with respect to a normal torque load. However, when the torque load exceeds a predetermined value, the stopper 36 starts to function.

Generally, in the steering joint device, it is required to dispose the first universal joint 1 and the second universal joint 2 with an optimal phase angle therebetween in accordance with a state of the used space. This phase angle is an angle made by the first cross shaft member 13 and the second cross shaft member 23, which is an angle made by the first yoke member 11 and the third yoke member 21. This is at the same time an angle θ' which is made by the above-mentioned straight line X1—X1, and a line Y1—Y1 connecting the centers of holes 22d, 22e. A setting of this phase angle was conventionally adjusted when the lower shaft 33 is secured to the bottom plate portion 22c of the second yoke member 22 of the second universal joint 2 by welding, or the like.

This phase setting has also been conducted by serration connection or by using a yoke integrally forged, instead of by welding.

However, there may be spatial limitations depending on the geometry of the vehicles, and it may be difficult or impossible to set a desired phase angle by these conventional methods.

SUMMARY OF THE INVENTION

An object of the present invention is to provide a steering joint device for which a desirable optimal phase angle can be set easily.

According to one principal aspect of the invention, steering joint device comprises a first universal joint to be coupled to a steering shaft, a second universal joint to be connected to the steering device side, and an anti-vibration device connected between the first universal joint and the second universal joint, and is arranged such that:

the first universal joint comprises a first yoke member to be connected to the steering shaft, a second yoke member connected to the anti-vibration device, and a first cross shaft member connecting the first yoke member to the second yoke member;

the second universal joint comprises a third yoke member to be connected to the steering gear device side, a fourth yoke member connected to the anti-vibration device, and a second cross shaft member connecting the third yoke member and the fourth yoke member; and the anti-vibration device is connected by two first pins to the bottom plate portion of the second yoke member through two holes formed through the bottom plate portion, and connected by two second pins, on a straight line which makes a predetermined angle θ (where 0<θ≦90°) with a straight line on which said two first pins are located, to the bottom plate portion of the fourth yoke member through two holes formed through the bottom plate portion of the fourth yoke member.

The steering joint device according to the present invention is preferably arranged such that:

the centers of the two holes which are formed on the bottom plate portion of the second yoke member are positioned on a straight line which makes a first predetermined angle with a straight line which is obtained by projecting an axial line of the shaft of the first cross shaft joint pivotally supported on the second yoke member at the two ends thereof onto the bottom plate portion, the centers of the two holes being equidistant from a point which is obtained by projecting the center of the first cross shaft joint onto said bottom plate; and the centers of the two holes which are formed on the bottom plate portion of the fourth yoke member are positioned on a straight line which makes a second predetermined angle with a straight line which is obtained by projecting an axial line of the shaft of the second cross shaft joint pivotally supported on the fourth yoke member at the two ends thereof onto the bottom plate portion, the centers of the two holes being equidistant from a point which is obtained by projecting the center of the second cross shaft joint onto said bottom plate portion.

Further, the steering joint device according to the present invention is preferably arranged such that the first predetermined angle is equal to the second predetermined angle.

According to another principal aspect of the invention, a steering joint device preferably comprises a first universal joint to be coupled to a steering shaft, a second universal joint to be connected to the steering device side, and an anti-vibration device connected between the first universal joint and the second universal joint, and is arranged such that:

the first universal joint comprises a first yoke member to be connected to the steering shaft, a second yoke member connected with the anti-vibration device, and a first cross shaft member coupling the first yoke member and the second yoke member;

the second universal joint comprises a third yoke member to be connected to the steering gear device side, a fourth yoke member connected to the anti-vibration device, and a second cross shaft member connecting the third yoke member and the fourth yoke member;

on the respective bottom plate portions of the second and fourth yoke members, two holes are formed axially symmetrically on a straight line which makes a predetermined angle θ (where 0<θ<90°) with a straight line obtained by projecting onto the respective bottom plate portions the shaft pivotally supporting a corresponding one of the first and second cross shaft members; and the anti-vibration device is connected by first pins to the bottom plate portion of the second yoke member through said two holes thereof and connected by second pins to the bottom plate portion of said fourth yoke member through said two holes of the bottom plate portion of the fourth yoke member on a straight line which makes a right angle with a straight line connecting the first pin connection portions, with the bottom plate portion of the fourth yoke member.

DESCRIPTION OF THE PREFERRED EMBODIMENTS

In the following description of embodiments of the invention, portions having the same structures and functions as those of the conventional technology described above will be given the same referential numerals.

Figure 1:
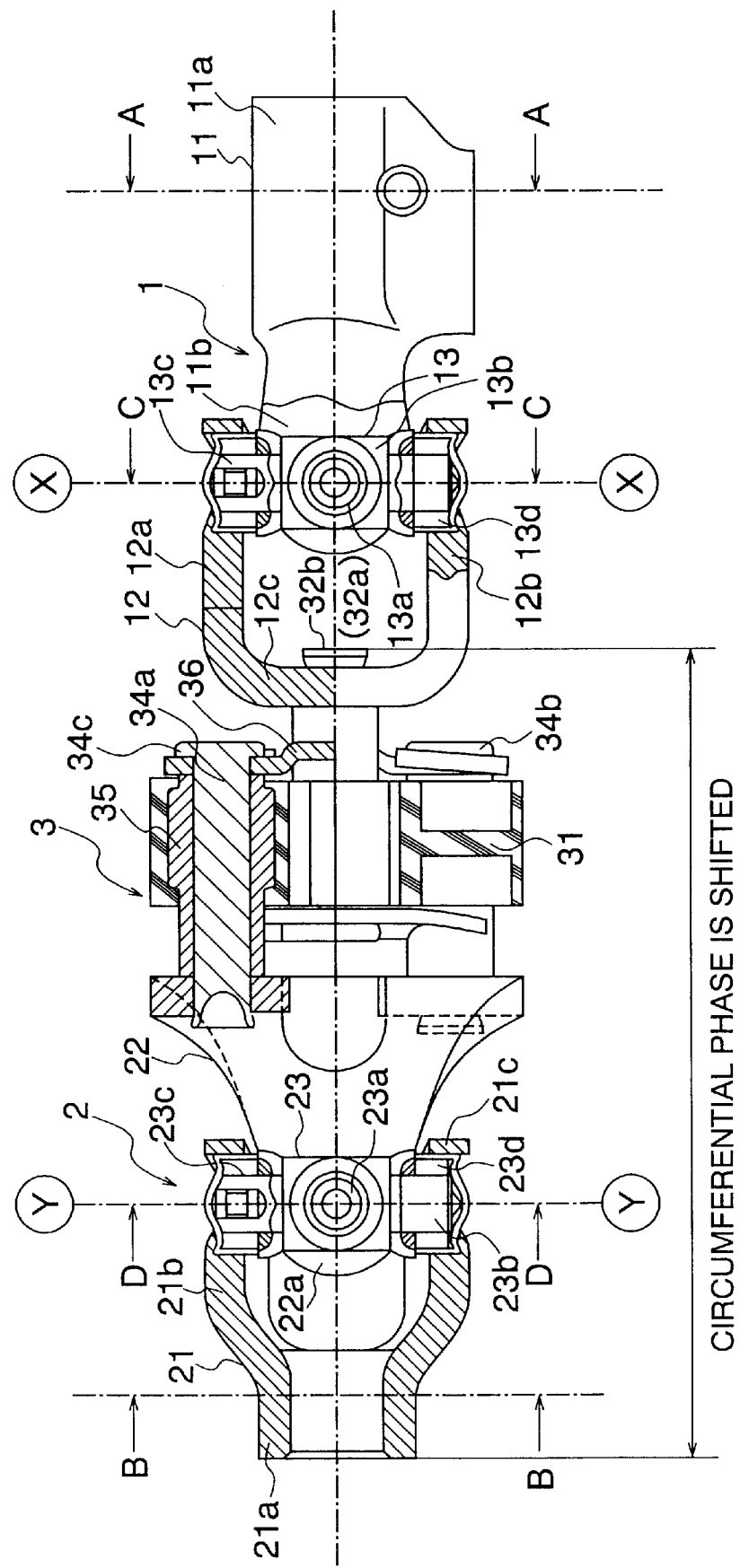
FIG. 1 is a cross-sectional view for showing structure of a preferred embodiment of the present invention, in which a circumferential phase is shifted with respect to a part of the structure for clear understanding of the drawing.

Referring to FIG. 1, a steering joint device is comprised of a first universal joint 1 which is fixed to the fore end side of a steering shaft (not shown), a second universal joint 2 which is coupled to the steering gear device side, and an anti-vibration device 3 for coupling these two universal joints with each other.

The first universal joint 1 includes a first yoke member 11, a second yoke member 12, and a cross shaft member 13 for coupling the first yoke member 11 with the second yoke member 12.

The first yoke member 11 integrally has a cylindrical portion 11a which is fitted on and fixed to the tip end of the unrepresented steering shaft and a yoke portion 11b which has a bifurcated opposed portions. The second yoke member 12 integrally has two side plate portions 12a, 12b which are extended in parallel to oppose to each other, and a bottom plate portion 12 for connecting these side plate portions 12a, 12b with each other integrally.

Figure 3A:
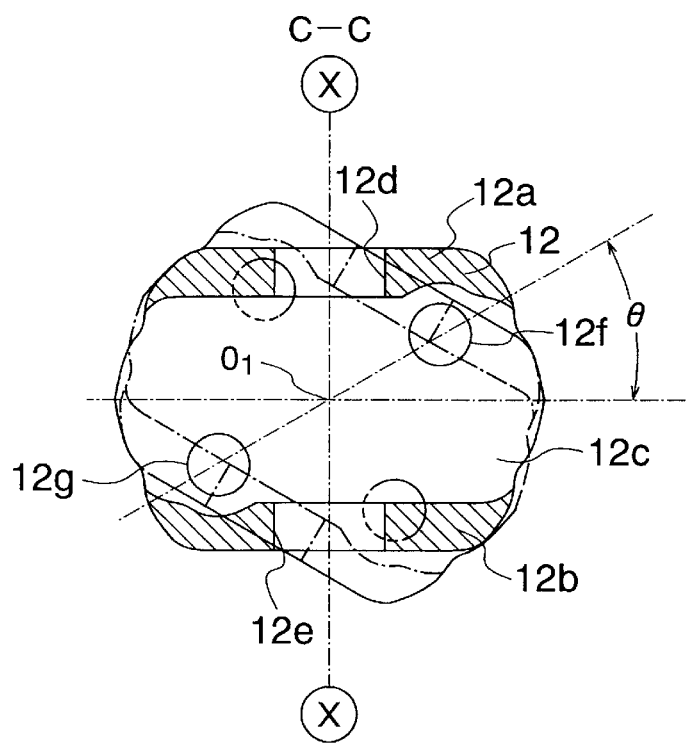
FIG. 3A is a cross-sectional view of a part of FIG. 1, taken along the line C—C, seen from the direction of the arrow.
Figure 3B:
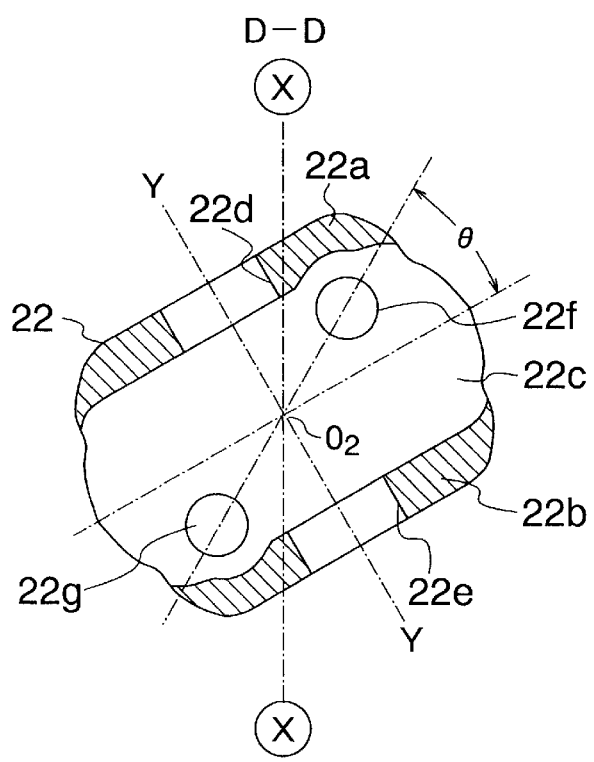
FIG. 3B is a cross-sectional view of a part of FIG. 1, taken along the line D—D, seen from the direction of the arrow.

One shaft 13a of the first cross shaft member 13 is extended perpendicular to the sheet plane of the FIG. 1 and is pivotally supported on the yoke portions 11b of the first yoke member 11 at the two shaft ends, whereas the two shaft ends of the other shaft 13b which extends at right angle with the former shaft 13a are respectively supported by the two side plate portions 12a, 12b of the second yoke member 12 through bearings 13c, 13d. To this end, the two side plate portions 12a, 12b of the second yoke member 12 are respectively provided with bearing holes 12d, 12e which are opposed to each other (see FIG. 3A).

On the bottom plate portion 12c of the second yoke member 12, there are formed two holes 12f, 12g to be connected with an anti-vibration device, which is to be described later, on a straight line which makes a predetermined angle θ with a straight line intersecting perpendicularly to a straight line obtained by projecting a straight line X—X connecting the centers of the bearing holes 12d, 12e onto the bottom plate portion 12c of the second yoke member 12, and which passes a point $O_1$ obtained by projecting the middle point of a segment of a line connecting the centers of the bearing holes 12d, 12e, with this point $O_1$ as the middle point therebetween.

On the other hand, a third yoke member 21 of the second universal joint 2 integrally has a cylindrical portion 21a which is fitted on and fixed to the shaft (not shown) on the steering gear side and yoke portions 21b, 21c which are bifurcated opposed portions extending away from the sterring gear side. A fourth yoke member 22 integrally has side plate portions 22a, 22b which extend in parallel to oppose to each other, and a bottom plate portion 22c integrally connecting these side plate portions 22a, 22b.

One shaft 23b of the second cross shaft member 23 is extended sertically on the sheet plane and is pivotally supported on the yoke portions 21b, 21c of the third yoke member 21 at the two shaft ends through bearings 23c, 23d, whereas the two shaft ends of the other shaft 23a which extends perpendicularly to the shaft 23b are respectively supported by the two side plate portions 22a, 22b of the third yoke member 22 through bearings (not shown). To this end, the two side plate portions 22a, 22b of the fourth yoke member 22 are respectively provided with bearing holes 22d, 22e which are opposed to each other.

On the bottom plate portion 22c of the fourth yoke member 22, there are formed two holes 22f, 22g having a point $O_2$ as the middle point therebetween on a straight line which makes a predetermined angle θ (where 0<θ<90°) with a straight line crossing perpendicularly to a straight line which is obtained by projecting a straight line Y—Y connecting the centers of the bearing holes 22d, 22e onto the bottom plate portion 22c and which passes the point $O_2$ obtained by projecting the middle point of a segment of a line for connecting the centers of the bearing holes 22d, 22e onto the bottom plate portion 22c.

The angular positional relationship between the bearing holes 12d, 12e for the first cross shaft member in the second yoke member 12 of the first universal joint 1 and the two holes 12f, 12g for the pin connection with the anti-vibration device 3 provided on the bottom plate portion 12c is made equivalent to the angular positional relationship between the bearing holes 22d, 22e for the second cross shaft member in the fourth yoke member 22 of the second universal joint 2 and the two holes 22f, 22g for the pin connection with the anti-vibration device 3 provided on the bottom plate portion 22c. In addition, in the present embodiment, the second yoke member 12 has completely the same configuration and size as those of the fourth yoke member 22.

Figure 4A:
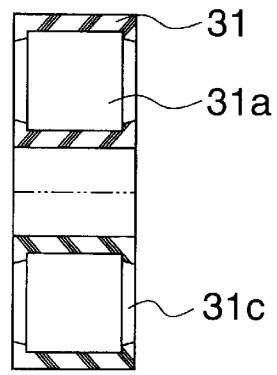
FIG. 4A is a central cross-sectional view of an anti-vibration rubber according to the present embodiment.
Figure 4B:
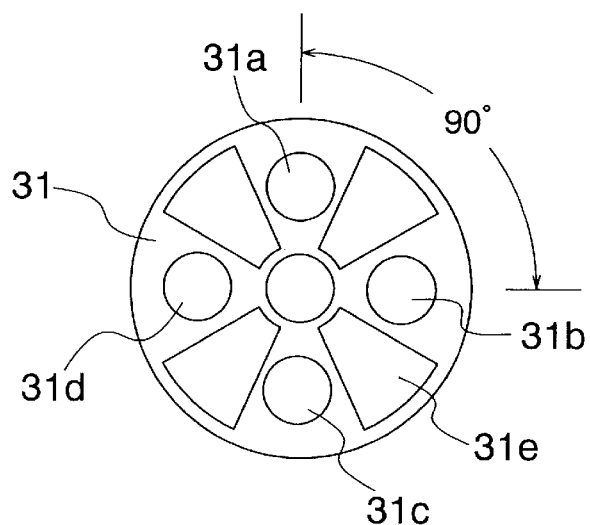
FIG. 4B is a side view of the anti-vibration rubber.
Figure 5:
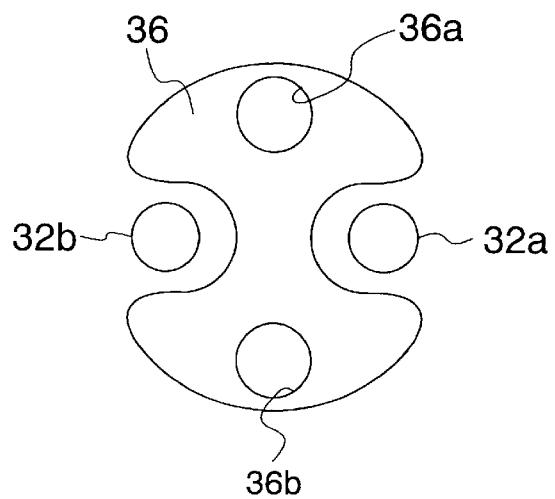
FIG. 5 is a view for showing a configurational and positional relationship between a metallic stopper and pins in an anti-vibration device according to the present embodiment.

The anti-vibration device 3 has a circular anti-vibration rubber 31, as shown in FIGS. 4A and 4B. This anti-vibration rubber 31 has a rigid structure with internal reinforced fibers. Four through holes 31a to 31d for pin insertion are formed on crossing straight lines perpendicular to each other and passing the center of the structure. A cross section of only one of the through holes is shown in FIG. 1.

A pair of the through holes 31b, 31d, out of the four through holes of the pin insertion, are opposed to the two holes 12f, 12g formed on the bottom plate portion 12c of the second yoke member 12 of the first universal joint 1, and pins 32a, 32b are inserted through these corresponding holes. A structure for connecting the pins 32a, 32b with the bottom plate portion 12c and the anti-vibration rubber 31 is the same as a structure for connecting the anti-vibration rubber 31 with the bottom plate portion 22c of the fourth yoke member 22 of the second universal joint 2. The latter is shown in the drawing and will be fully described.

The above-mentioned through holes 22f, 22g for pin insertion are formed on the bottom plate portion 22c of the fourth yoke member 22 to face the two remaining through holes 31a, 31c of the anti-vibration rubber 31, and pins 34a, 34b are inserted through the paired holes 22f, 31a; 22g, 31c respectively. FIG. 1 shows a cross section of a part of the pin 34a out of the two pins. More specifically, the pin 34a is inserted through the hole of the anti-vibration rubber 31 through a bush 35, and a stopper 36 made of a metallic plate is interposed between an enlarged end portion 34c of the pin 34a and the anti-vibration rubber 31. The pin 34a is caulked on the bottom plate portion 22c at the opposite end portion to connect the anti-vibration rubber 31 to the fourth yoke member 22. The bush 35 is provided to surround the pin 34a from the stopper 36 to the bottom plate portion 22c. The stopper 36 is extended and formed with recessed portions to stride over the above-mentioned pins 32a, 32b, which are adapted to connect the bottom plate portion 12c of the second yoke member 12 of the first universal joint 1 with the anti-vibration device 3, so as to form a predetermined space between the stopper 36 and the outer periphery of the each pin 32a, 32b. The stopper 36 has two holes 36a, 36b through which the pins 34a, 34b are inserted, and is sandwiched to be secured by and between the enlarged end portions 34c, 34d of these pins and the anti-vibration rubber.

The bottom plate portion 12c of the second yoke member 12 and the anti-vibration rubber 31, and the anti-vibration rubber 31 and the bottom plate portion 22c of the fourth yoke member 22 are respectively connected by the pins 32a, 32b and the pins 34a, 34b, in the manner as mentioned above. In this case, a torque is transmitted through the anti-vibration rubber 31 with respect to a normal torque load. However, when the torque load exceeds a predetermined value, the stopper 36 starts to function.

Fan-shaped recesses 3le are formed on the two surfaces of the anti-vibration rubber 31 between the adjacent through holes 31a to 31d for pin insertion, so as to adjust the rigidity of the anti-vibration rubber.

Figure 2:
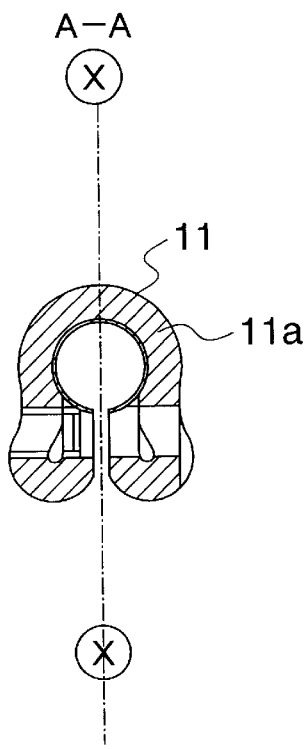
FIG. 2A is a cross-sectional view of a part of FIG. 1, taken along the line A—A, seen from the direction of the arrow.
FIG. 2B is a cross-sectional view of a part of FIG. 1, taken along the line B—B, seen from the direction of the arrow.
Figure 2:
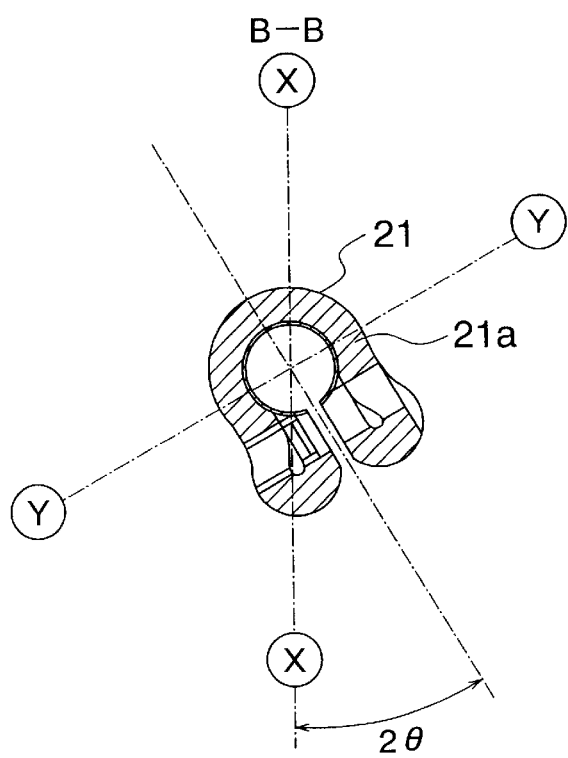

With the above-mentioned structures for connecting the first universal joint 1 with the anti-vibration device 3, and the anti-vibration device 3 with the second universal joint 2, an angle made by the first universal joint 1 and the second universal joint 3, i.e., the phase angle, becomes 2θ, as shown in FIG. 2B.

Figure 6:
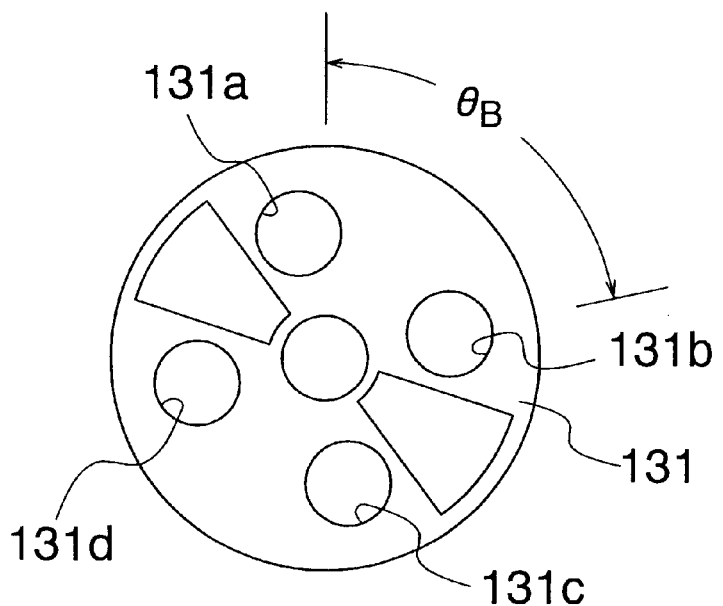
FIG. 6 is a side view of a anti-vibration rubber according to a variation of the present embodiment.

According to a variation of the embodiment, the straight line made by the pins 32a, 32b and the straight line made by the pins 34a, 34b are disposed to make a predetermined angle $\theta_B$ other than 90° ($0<\theta_B<90°$) therebetween. To this end, in the variation, an anti-vibration rubber 131 as shown in FIG. 6 is used, instead of the anti-vibration rubber 31. More specifically, as a whole structure, two pairs of through holes 131a, 131c and 131b, 131d for pin insertion are respectively formed on two straight lines which are crossing with each other with the predetermined angle $\theta_B$ (where $0<\theta_B<90°$) therebetween on the circular anti-vibration rubber 131, and these through holes 131a, 131b are respectively connected with the pins 34a, 34b of the second universal joint 2. Also, the through holes 131b, 131d are respectively connected with the pin 32a, 32b of the first universal joint 1.

Figure 7:
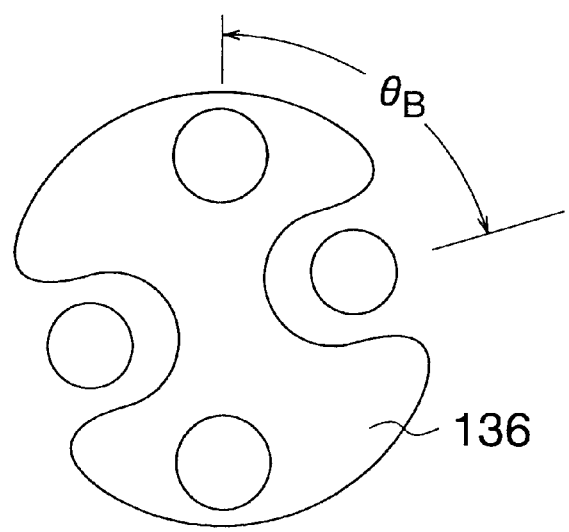
FIG. 7 is a view for showing a configurational and positional relationship between a metallic stopper and pins according to the above-mentioned variation.
Figure 8:
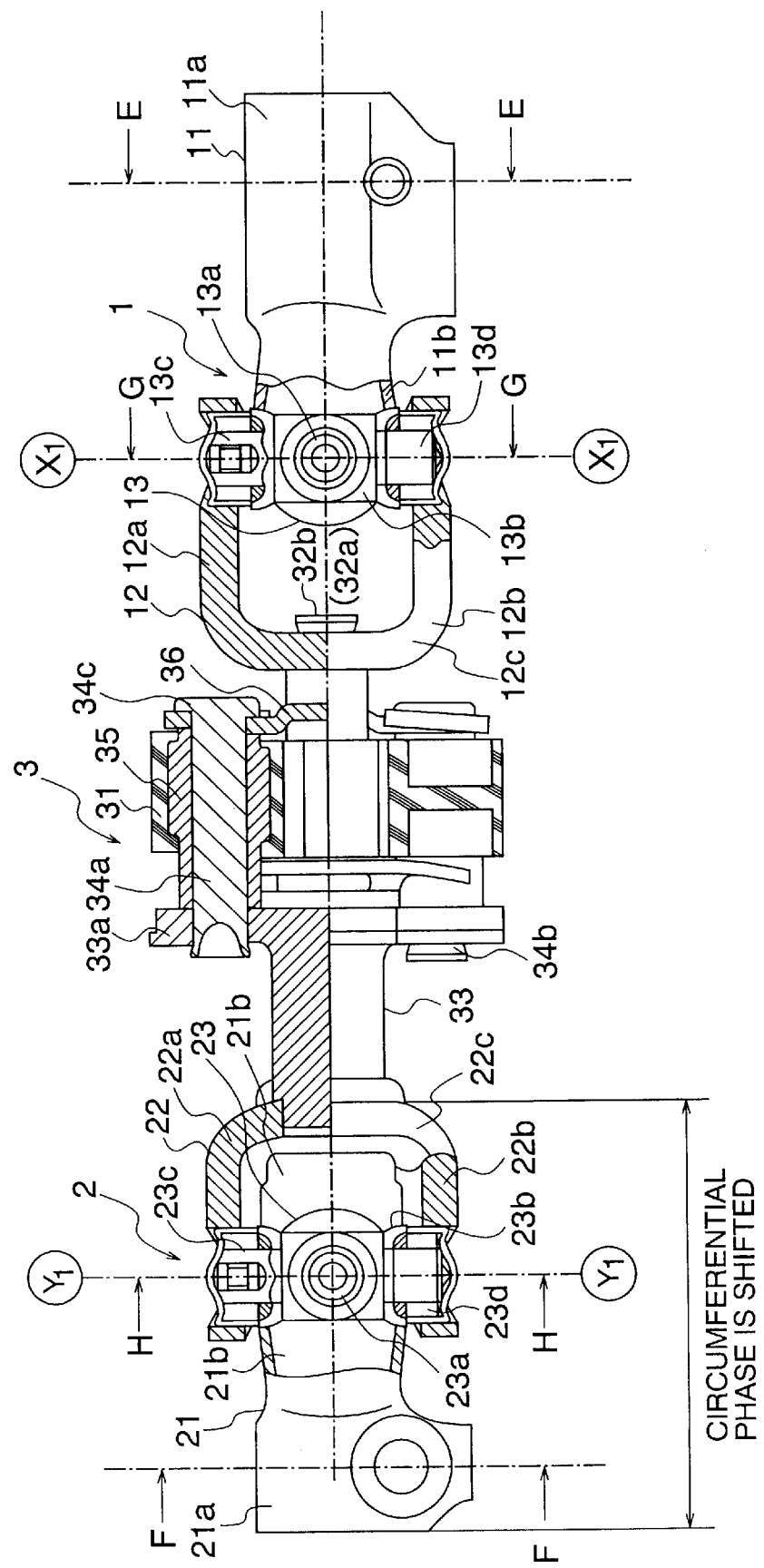
FIG. 8 is a cross-sectional view for showing structure of a conventional steering joint device for a car.
Figure 9:
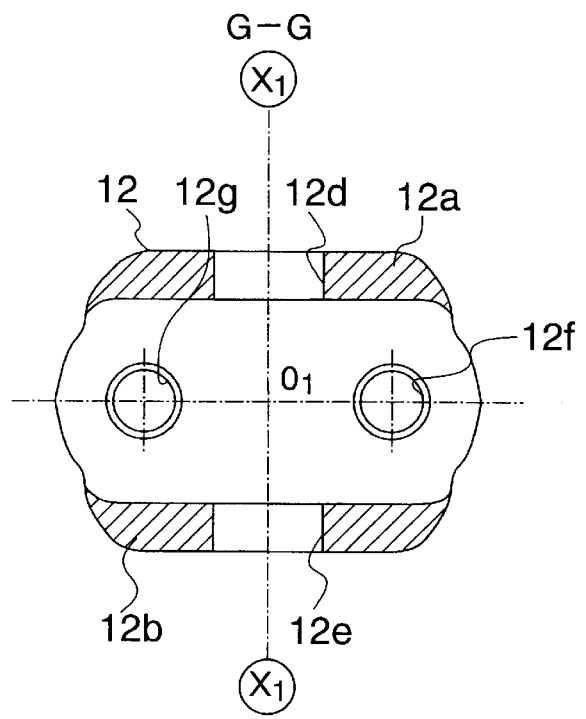
FIG. 9A is a cross-sectional view of a part of FIG. 8, taken along the line G—G, seen from the direction of the arrow.
FIG. 9B is a cross-sectional view of a part of FIG. 8, taken along the line H-H, seen from the direction of the arrow.
Figure 9:
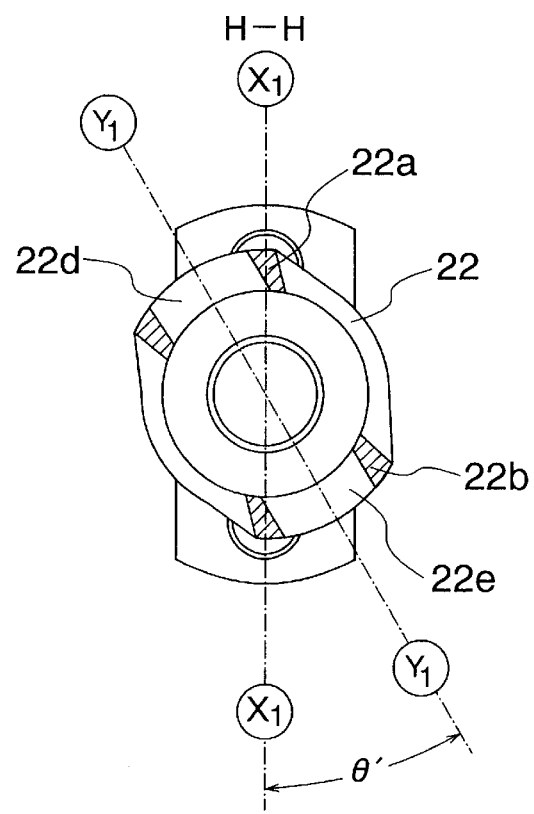
Figure 10:
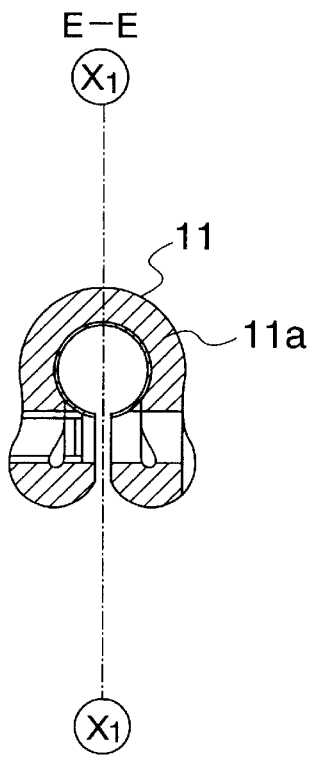
FIG. 10A is a cross-sectional view of a part of FIG. 8, taken along the line E—E, seen from the direction of the arrow.
FIG. 10B is a cross-sectional view of a part of FIG. 8, taken along the line F—F, seen from the direction of the arrow.
Figure 10:
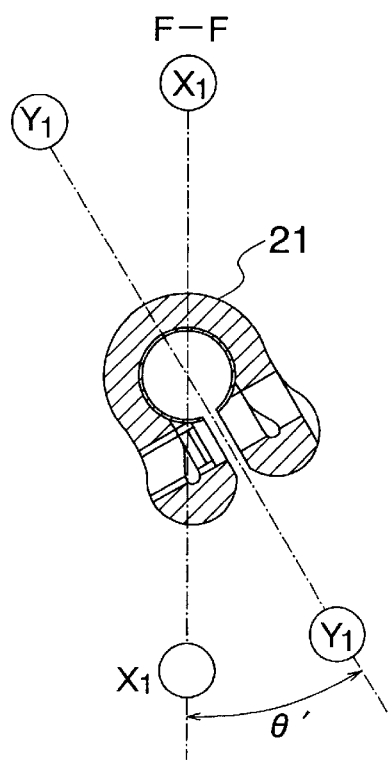

In the present variation, a stopper 136 as shown in FIG. 7 is used, instead of the stopper 36 in the above-mentioned embodiment.

Constituent parts other than those described above are entirely the same as those of the above-mentioned embodiment, and the structure of the present variation is the same as that of the above-mentioned embodiment except that the first universal joint 1 and the second universal joint 2 are connected to match the anti-vibration rubber 131.

Specifically, a desired phase angle can be set by arranging the second yoke member 12 of the first universal joint 1 and the second yoke member 22 of the second universal joint 2 as described above.

According to the present invention, it is possible to provide a steering joint device which has a phase angle corresponding to the geometry of the position of use, without the welding, serration, or the like. As a result, it is possible to provide a low-cost steering joint device for a car.

What is claimed is:

1. A steering joint device for a vehicle, comprising:
   a first universal joint constructed to be connected to a steering shaft,
   a second universal joint constructed to be connected to a shaft of a steering gear device side, and
   an anti-vibration device connected between said first universal joint and said second universal joint,
   characterized in that:
      said first universal joint comprises a first yoke member constructed to be connected to the steering shaft, a second yoke member connected to said anti-vibration device, and a first cross shaft member connecting said first yoke member to said second yoke member;
      said second universal joint comprises a third yoke member constructed to be connected to the shaft of the steering gear device side, a fourth yoke member connected to said anti-vibration device, and a second cross shaft member connecting said third yoke member to said fourth yoke member; and
      said anti-vibration device is connected by two first pins to a bottom plate portion of said second yoke member through two first holes formed on said bottom plate portion, and connected by two second pins, located on a straight line which is oriented at a predetermined angle θ (where $0<\theta\leq90°$) with a straight line on which said two first Pins are located, to said bottom plate portion of said fourth yoke member through two second holes formed on said bottom plate portion of said fourth yoke member.

2. A steering joint device according to claim 1, wherein centers of said two first holes are positioned on a straight line which makes a first predetermined angle with a straight line which is obtained by projecting an axial line of a shaft of said first cross shaft member pivotally supported on said second yoke member onto said bottom plate portion of said second yoke member, said centers of said two first holes being equidistant from a point which is obtained by projecting a center of said first cross shaft member onto said bottom plate portion of said second yoke member; and
   centers of said two second holes are positioned on a straight line which makes a second predetermined angle with a straight line which is obtained by projecting an axial line of a shaft of said second cross shaft member pivotally supported on said fourth yoke member onto said bottom plate portion of said fourth yoke member, said centers of said two second holes being equidistant from a point which is obtained by projecting a center of said second cross shaft member onto said bottom plate portion of said fourth yoke member.

3. A steering joint device according to claim 2, wherein said first predetermined angle is equal to said second predetermined angle.

4. A steering joint device for a vehicle, comprising:
   a first universal joint constructed to be connected to a steering shaft,
   a second universal joint constructed to be connected to a shaft of a steering device side, and
   an anti-vibration device connected between said first universal joint and said second universal joint, characterized in that:

said first universal joint comprises a first yoke member constructed to be connected to the steering shaft, a second yoke member connected to said anti-vibration device, and a first cross shaft member connecting said first yoke member to said second yoke member;

said second universal joint comprises a third yoke member constructed to be connected to the shaft of the steering gear device side, a fourth yoke member connected to said anti-vibration device, and a second cross shaft member connecting the third yoke member and the fourth yoke member; and each of said second yoke member and said fourth yoke member has a bottom plate portion in which two holes are formed axially symmetrically on a straight line which makes a predetermined angle θ (where 0<θ<90°) with a straight line obtained by projecting, onto that bottom plate portion, an axial line of a shaft pivotally supporting a corresponding one of said first and second cross shaft members to that yoke member; and said anti-vibration device is connected by first pins to said bottom plate portion of said second yoke member through the two holes thereof, and connected by second pins to said bottom plate portion of said fourth yoke member through the two holes thereof, the straight line on which the two holes of said bottom plate portion of said second yoke member are formed being oriented at a right angle with respect to the straight line on which the two holes of said bottom plate portion of said fourth yoke member are formed.

5. A steering joint device for a vehicle, comprising:

a first universal joint constructed to be connected to a steering shaft, a second universal joint constructed to be connected to a shaft of a steering gear device side, and an anti-vibration device connected between said first universal joint and said second universal joint, characterized in that:

said first universal joint comprises a first yoke member constructed to be connected to the steering shaft, a second yoke member connected to said anti-vibration device, and a first cross shaft member connecting said first yoke member to said second yoke member;

said second universal joint comprises a third yoke member constructed to be connected to the shaft of the steering gear device side, a fourth yoke member connected to said anti-vibration device, and a second cross shaft member connecting said third yoke member to said fourth yoke member; and said anti-vibration device is connected by two first pins to a bottom plate portion of said second yoke member through two first holes formed on said bottom plate portion, and connected by two second pins to a bottom plate portion of said fourth yoke member through two second holes formed on said bottom plate portion of said fourth yoke member, a straight line which connects centers of said two second holes being oriented at a predetermined angle θ (where 0<θ≦90°) with respect to a straight line which connects centers of said two first holes.

6. A steering joint device according to claim 5, wherein the straight line connecting the centers of said two first holes makes a first predetermined angle with a straight line which is obtained by projecting an axial line of a shaft of said first cross shaft member pivotally supported on said second yoke member onto said bottom plate portion of said second yoke member, said centers of said two first holes being equidistant from a point which is obtained by projecting a center of said first cross shaft member onto said bottom plate portion of said second yoke member; and the straight line connecting the centers of said two second holes makes a second predetermined angle with a straight line which is obtained by projecting an axial line of a shaft of said second cross shaft member pivotally supported on said fourth yoke member onto said bottom plate portion of said fourth yoke member, said centers of said second holes being equidistant from a point which is obtained by projecting a center of said second cross shaft member onto said bottom plate portion of said fourth yoke member.

7. A steering joint device according to claim 6, wherein said first predetermined angle is equal to said second predetermined angle.

* * * * *